(12) United States Patent
Geary

(10) Patent No.: US 12,527,253 B2
(45) Date of Patent: Jan. 20, 2026

(54) VARIABLE CHUTE DEVICE FOR POWER MOWER

(71) Applicant: Speedtrap Chute LLC, Attica, MI (US)

(72) Inventor: Daniel Geary, Attica, MI (US)

(73) Assignee: Speedtrap Chute LLC, Attica, MI (US)

( * ) Notice: Subject to any disclaimer, the term of this patent is extended or adjusted under 35 U.S.C. 154(b) by 848 days.

(21) Appl. No.: 17/831,735

(22) Filed: Jun. 3, 2022

(65) Prior Publication Data

US 2022/0386525 A1 Dec. 8, 2022

Related U.S. Application Data

(60) Provisional application No. 63/196,803, filed on Jun. 4, 2021.

(51) Int. Cl.
*A01D 34/71* (2006.01)
*A01D 34/66* (2006.01)
*A01D 101/00* (2006.01)

(52) U.S. Cl.
CPC .......... *A01D 34/71* (2013.01); *A01D 34/667* (2013.01); *A01D 2101/00* (2013.01)

(58) Field of Classification Search
CPC .... A01D 34/71; A01D 34/667; A01D 34/001; A01D 34/124; A01D 34/81; A01D 34/49; A01D 2101/00
USPC ................................................ 56/320.2, 194
See application file for complete search history.

(56) References Cited

U.S. PATENT DOCUMENTS

| | | | | |
|---|---|---|---|---|
| 3,008,284 A | * | 11/1961 | Bright | A01D 34/71 55/378 |
| 3,423,918 A | * | 1/1969 | Siwek | A01D 34/71 83/929.2 |
| 3,721,078 A | * | 3/1973 | Haffner | A01D 34/71 56/320.2 |
| 6,862,874 B2 | | 3/2005 | Seegert | |
| 6,874,309 B1 | * | 4/2005 | Bellis, Jr. | A01D 42/005 56/320.2 |
| 7,337,602 B1 | * | 3/2008 | Butler | A01D 34/005 56/320.2 |
| 7,406,817 B2 | | 8/2008 | Bledsoe | |
| 7,448,195 B2 | * | 11/2008 | Kohler | A01D 34/82 56/320.2 |

(Continued)

*Primary Examiner* — Joseph M Rocca
*Assistant Examiner* — Sunny D Webb
(74) *Attorney, Agent, or Firm* — Dinsmore & Shohl LLP

(57) ABSTRACT

A variable chute device includes an elongated member and a deflection plate. The elongated member extends between the deflection plate and a passenger area and a power mower. The deflection plate includes a main body and an attachment portion. The attachment portion extends from the main body and movably couples the main body to a deck of the power mower. The main body is movable between a closed position, an open position, and a plurality of variably controlled partially-open positions by actuation of the elongated member. In the closed position, the main body extends across the opening of the chute to prevent grass clippings from exiting the chute through the opening, and in the plurality of variably controlled open partially-positions, the main body is spaced apart from the opening of the chute at varying gaps to control an amount of the grass clippings to exit the chute through the opening.

20 Claims, 4 Drawing Sheets

(56) References Cited

U.S. PATENT DOCUMENTS

| | | | |
|---|---|---|---|
| 7,823,373 B1 | 11/2010 | Loxterkamp et al. | |
| 9,439,347 B2 * | 9/2016 | Oehlsen | A01D 34/006 |
| 9,485,909 B2 * | 11/2016 | Shoji | A01D 34/71 |
| 9,485,911 B2 | 11/2016 | Thorman et al. | |
| 10,791,672 B2 * | 10/2020 | Berglund | A01D 34/71 |
| 10,897,845 B2 * | 1/2021 | Walker | A01D 34/71 |
| 11,627,699 B2 * | 4/2023 | Foster | A01D 34/006 |
| | | | 56/320.2 |
| 11,805,727 B1 * | 11/2023 | Engelen | A01D 34/71 |
| 2004/0128970 A1 * | 7/2004 | Gazlay | A01D 34/71 |
| | | | 56/320.2 |

\* cited by examiner

VARIABLE CHUTE DEVICE FOR POWER MOWER

CROSS-REFERENCE TO RELATED APPLICATION

The present disclosure claims the benefit of U.S. Provisional Patent Application No. 63/196,803, filed on Jun. 4, 2021, the contents of which are incorporated by reference in its entirety.

TECHNICAL FIELD

The present specification generally relates to a deflection plate for a power mower chute and, more specifically, a deflection plate configured to vary a distance that grass clippings travel from a power mower.

BACKGROUND

Power riding mowers direct the flow of clippings out of a clipping passage positioned in a side of a blade housing or deck. The clippings are directed by chutes that are mounted to the deck on the side of the mower. The chute is mounted to posts, which extend above the deck over the opening. When using a chute, there are times when it would be advantageous to block a portion of the flow of clippings outwardly from the deck, such as when mowing along a flowerbed or along a driveway. In other cases, it would be desirable to variable control the flow of clippings in order to discharge them precisely where needed from the chute to avoid a buildup of grass clippings.

SUMMARY

In one embodiment, a variable chute device for a power mower is provided. The power mower includes a passenger area, a deck, and a chute extending from the deck. The chute includes an opening through which the chute expels grass clippings away from the power mower. The variable chute device includes an elongated member and a deflection plate. The elongated member extends between the deflection plate and the passenger area. The deflection plate includes a main body and an attachment portion. The main body includes a deflection surface. The attachment portion extends from the main body and movably couples the main body to the deck of the power mower. The main body is movable between a closed position, an open position, and a plurality of variably controlled partially-open positions by actuation of the elongated member. In the closed position, the main body extends across the opening of the chute to prevent grass clippings from exiting the chute through the opening, and in the plurality of variably controlled open partially-positions, the main body is spaced apart from the opening of the chute at varying gaps to control an amount of the grass clippings to exit the chute through the opening.

A power mower having a variable chute device, a deck positioned above one or more power mower blades in a power mower vertical direction, a chute extending from the deck, the chute having an opening, the chute is configured to expel grass clippings through the opening away from the power mower, and a passenger area. The variable chute device includes an elongated member and a deflection plate. The elongated member includes a first end and a second end opposite. The second end extending to the passenger area. The first end of the elongated member coupled to the deflection plate, the deflection plate having a main body and an attachment portion. The main body includes a deflection surface and a periphery extending around the deflection surface. The attachment portion extends from the periphery of the main body to movably couple the main body to the deck of the power mower. The attachment portion has a pair of coupling flanges extending transversely to the main body and coupled to the deck of the power mower to pivotally couple the main body to the deck of the power mower. Wherein the main body is movable between a closed position and a plurality of variably controlled partially-open positions by actuation of the elongated member, wherein in the closed position, the main body extends across the opening of the chute to prevent grass clippings from exiting the chute through the opening, and in the plurality of variably controlled partially-open positions, the main body is spaced apart from the opening of the chute at varying gaps to control an amount of the grass clippings to exit the chute through the opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 4 depicts a flow diagram of an illustrative method of moving the deflection plate of FIG. 1 between a plurality of positions to vary control of grass clippings, according to one or more embodiments shown and described herein.

DETAILED DESCRIPTION

Embodiments disclosed herein are generally directed to a variable chute device including a deflection plate and an elongated member such as a flexible member (cable) or a rigid member (rod). The variable chute device is movably coupled to a mower deck of a power mower. The elongated member is attached at one end to the deflection plate and extends to a passenger area of the power mower at the other end. The elongated member is physically manipulatable by a passenger positioned in the passenger area of the power mower to rotate the deflection plate between a closed position, an open position, and an infinitely number of positions therebetween to variable control the amount of opening of the chute to control the flow of grass clippings (hereinafter referred to as a plurality of variable controlled partially-open positions). In the closed position, the deflection plate extends across an opening of a chute of the mower deck of the power mower to prevent grass clippings from exiting out of the opening. The elongated member may be moved, which in turn moves the deflection plate to allow grass clippings to exit the chute in a controlled and variable manner. In one example, the elongated member may be pulled to move the deflection plate from the closed position to a plurality of variable controlled partially-positions by rotating the deflection plate away from the opening to allow grass clippings to exit the chute at a specific rate that is less than an open position. That is, the deflection plate is movable to varying degrees or distances from the opening to vary the amount or distance that the grass clippings are expelled by the chute.

Figure 1:
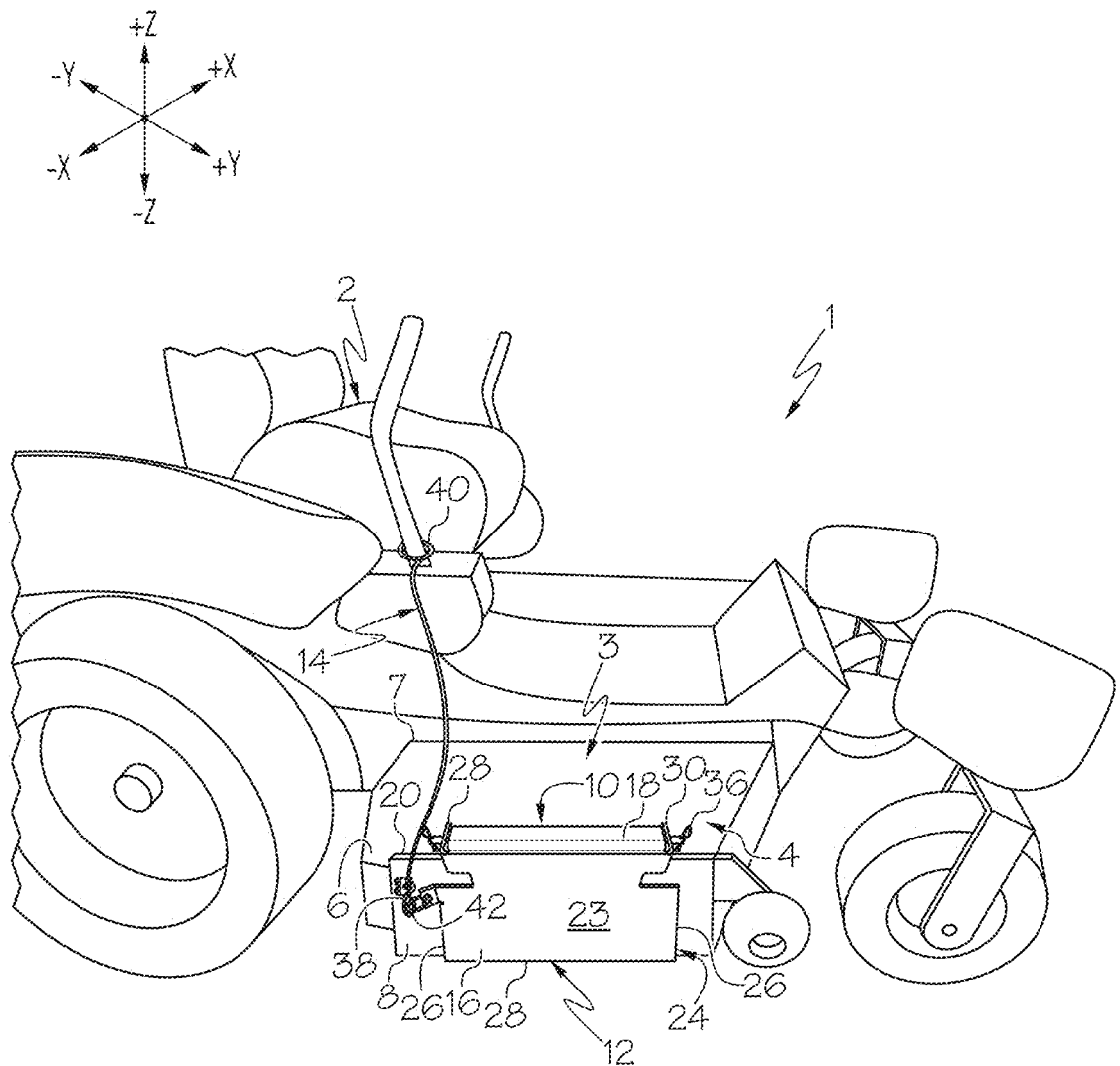
FIG. 1 schematically depicts a perspective view of a variable chute device for a powered mower with a deflection plate in a closed position, according to one or more embodiments shown and described herein.

As used herein, the term "power mower longitudinal direction" refers to the forward-rearward direction of the vehicle (i.e., in the +/−Y-direction depicted in FIG. 1). The term "power mower lateral direction" refers to the cross-vehicle direction (i.e., in the +/−X-direction depicted in FIG. 1), and is transverse to the vehicle longitudinal direction. The term "power mower vertical direction" or "above" or "below" refer to the upward-downward direction of the vehicle (i.e., in the +/−Z-direction depicted in FIG. 1).

Various embodiments of the variable chute device and the operation of the variable chute device will be described in more detail herein.

Figure 2A:
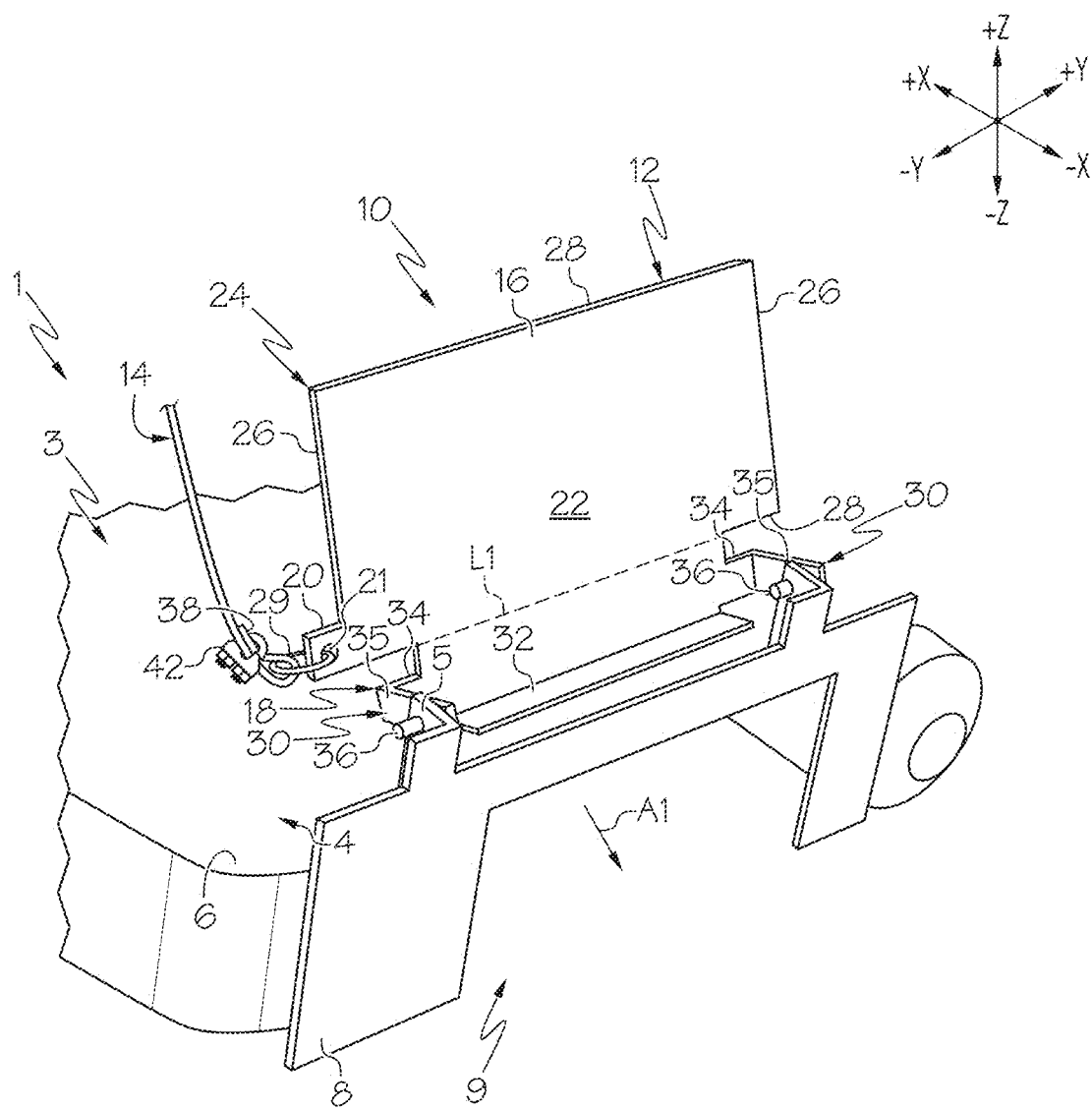
FIG. 2A schematically depicts a partially isolated perspective view of the variable chute device of FIG. 1 with the deflection plate in an open position, according to one or more embodiments shown and described herein.
Figure 2B:
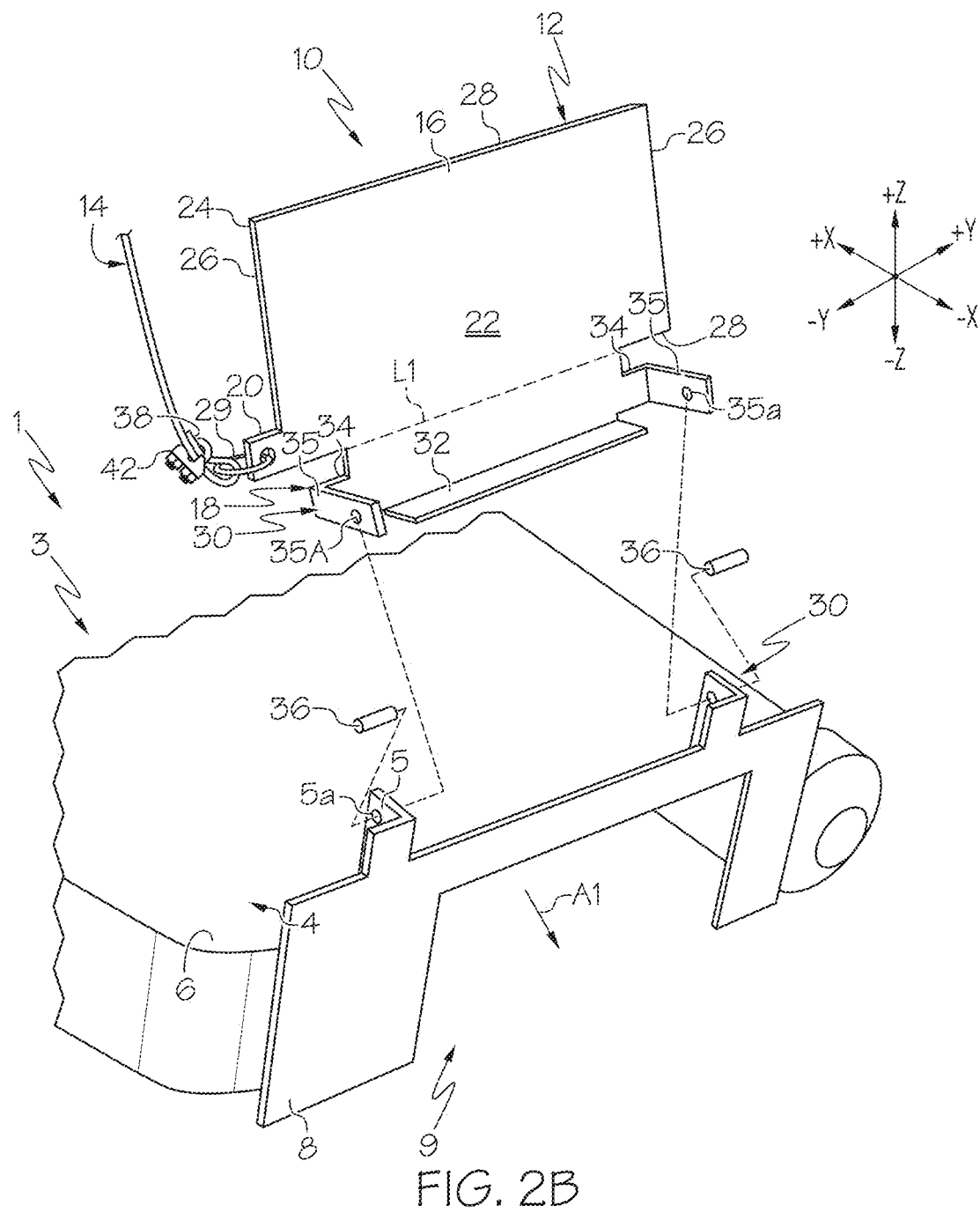
FIG. 2B schematically depicts a partially isolated exploded view of the variable chute device of FIG. 1, according to one or more embodiments shown and described herein.

Referring initially to FIGS. 1 and 2A-2B, a variable chute device 10 for a power mower 1 is depicted. The power mower 1 may be a zero turn type mower that may include a passenger area 2, a deck 3, and a chute 4 extending from the deck 3. The passenger area 2 may be configured to house a passenger when operating the power mower 1, and may be a seat for the passenger to sit on or a platform for the passenger to stand on. As such the passenger area 2 may be positioned above the deck 3 in the power mower vertical direction (e.g., in the +/−Z direction) and/or may be positioned behind the deck 3 in the power mower longitudinal direction (e.g., in the +/−Y direction).

The deck 3 may include a set of blades (not shown) configured to cut grass, and a pair of attachment flanges 5 extending from an exterior surface 6 of the deck 3. The pair of attachment flanges 5 may each include an aperture 5a (FIG. 2B) extending therethrough. The deck 3 may be positioned to circumferentially surround the blades on three sides with pulleys and belts to drive the blades positioned above the power mower blades in the power mower vertical direction (i.e., in the +/−Z direction). The deck 3 may direct grass clippings G (FIGS. 3B-3C) toward the chute 4 in the direction indicated by arrow A1, depicted in FIG. 2A. The chute 4 may include a first side 7 coupled to, or integrally formed, with the deck 3, an opposite second side 8, and an opening 9 formed in the second side 8. The chute 4 may receive clippings G (FIGS. 3B-3C) from the blades of the deck 3 and may expel grass clippings G (FIGS. 3B-3C) through the opening 9 and away from the deck 3 of the power mower 1.

The variable chute device 10 may include a deflection plate 12 and an elongated member 14. The deflection plate 12 may be pivotally coupled to a portion of the deck 3 or the chute 4 of the power mower 1, and the elongated member 14 may be coupled to the deflection plate 12. The elongated member 14 may be configured to pivot the deflection plate 12 relative to the deck 3 about pivot axis P.

The deflection plate 12 may include a main body 16, an attachment portion 18, and a tab 20. Each of the tab 20, the attachment portion 18, and the main body 16 of the deflection plate 12 may be formed together as a single, monolithic piece, formed separately and fixedly coupled together, or a combination thereof. For example, the attachment portion 18 may be formed of a separate piece from the main body 16 and coupled to the main body 16 by fasteners, adhesive, welding, or the like. While the variable chute device 10 is described as movable relative to the deck 3 and/or the chute 4 of the power mower 1 to selectively restrict grass clippings G (FIGS. 3B-3C) from exiting the chute 4, this is merely illustrative, and it is contemplated and possible that the variable chute device 10 is movably coupled in other manners, such as slidably coupled, rotatable coupled, and/or the like, to allow the variable chute device 10 to move relative to the deck 3 and/or the chute 4 of the power mower 1.

The main body 16 may include a deflection surface 22, an outer surface 23 opposite the deflection surface 22 to define a thickness, and a periphery 24 extending around the deflection surface 22. The periphery 24 may include a first pair of edges 26 and a second pair of edges 28 that extend transversely to the first pair of edges 26. The first pair of edges 26 extend between the second pair of edges 28. The second pair of edges 28 may extend along phantom line L1 that separates the main body 16 from the attachment portion 18. While the main body 16 is depicted as having a rectangular shape, it is contemplated and possible that the main body 16 has any size and shape capable of extending across the opening 9 of the deck 3 to block the flow of grass clippings G through the opening 9. For example, the main body 16 may be square, circular, hexagonal, or the like. The main body 16 may deflect and stop grass clippings G from extending out of the opening 9 of the chute 4. That is, in the closed and in the plurality of variable open positions, the deflection surface 22 faces the opening 9 such that clippings G (FIGS. 3B-3C) make contact with at least a portion of the deflection surface 22 of the main body 16.

The main body 16 may be formed of any material capable of restricting the movement of grass clippings G (FIGS. 3B-3C) out of the opening 9 of the chute 4, such as, for example, steel. Other example materials may be alloys, polymers, and/or the like. The main body 16 may be formed of a material and sized so that a weight of the main body 16 resists movement of the main body 16 by contact from the grass clippings G when in the closed position. In any of the plurality of variable controlled partially-open positions, the elongated member may assist in maintaining the partially-open position. In embodiments, the deflection plate 12 may further include a weight (not shown) coupled to the main body 16 to increase the weight of the deflection plate 12 and resist movement when contacted by grass clippings G.

The attachment portion 18 may extend from one of the second pair of edges 28 of the periphery 24 of the main body 16. The attachment portion 18 may extend from one of the pair of edges 28 along line L1. In some embodiments, the attachment portion 18 may be monolithically formed with the main body 16 to form a unitary structure. In other embodiments, the attachment portion 18 may be a separate component that may be coupled to the main body 16 via fasteners such as screws, rivets, bolt and nut, adhesive, epoxy or welding.

The attachment portion 18 may include a pair of coupling flanges 30 that extend transversely to the main body 16, and a flange member 32 the extends transversely to the main body 16 and the pair of coupling flanges 30. The flange member 32 may extend between the pair of coupling flanges 30 so that when the deflection plate 12 is coupled to the chute 4, the flange member 32 extends from a position in front of the opening 9 of the chute 4 (e.g., in the −X direction) to a position over the opening 9 in the power mower vertical direction (e.g., in the +/−Z direction) and may be configured to prevent grass clippings G (FIGS. 3B-3C) from exiting the chute 4 upward between the deflection plate 12 and the opening 9. The coupling flanges 30 may be spaced apart from the main body 16. Each of the coupling flanges 30 may include an extension portion 34 and a coupling portion 35. The extension portion 34 may extend in parallel with the main body 16 and the coupling portion 35 may extend transversely to the extension portion 34. The coupling portions 35 may extend from the extension portion 34 toward the attachment flanges 5 of the deck 3 in the power mower lateral direction (i.e., in the +/−X direction) to be pivotally coupled to the attachment flanges 5. As shown in FIG. 2B, the coupling portions 35 may each include an aperture 35a extending therethrough.

Still referring to FIGS. 1 and 2A-2B, a pair of pins 36 may extend through the aperture 35a of each the pair of coupling portions 35 of the coupling flanges 30 and the aperture 5a of each of the attachment flanges 5 of the deck 3. Each of the pair of pins 36 movably or pivotally couple the deflection plate 12 to the deck 3, and/or the chute 4 about pivot axis P. That is, the deflection plate 12 may move or pivot about pivot axis P in the directions indicated by arrow A2 in FIG. 3B and arrow A3 in FIG. 3C. Each one of the pair of pins 36 may be any traditional pin for movably coupling, such as pivotal coupling. For example, each of the pair of pins 36 may be a cotter pin, a clevis pin, and/or the like. In some embodiments, the pins 36 may be quick release pins. The pins 36 may be inserted through the pair of coupling flanges 30 and the pair of attachment flanges 5 on the deck 3 and/or the chute 4 to mount the deflection plate 12 to the deck 3 such that the deflection plate 12 hangs from the attachment flanges 5 downward in the power mower vertical direction (e.g., in the +/−Z direction) to cover the opening 9 in the chute 4 in the closed position and moves variably in the power mower vertical direction (e.g., in the +/−Z direction) about pivot axis P between the plurality of variably controlled partially-open positions until the deflection plate 12 is in the open position, as described in greater detail herein.

The tab 20 may extend from one of the first pair of edges 26 of the periphery 24 of the main body 16. The one of the first pair of edges 26 of the periphery 24 from which the tab 20 extends may be the edge that is positioned closest to the passenger area 2 in the power mower longitudinal direction (e.g., in the +/−Y direction). In some embodiments, the tab 20 includes a aperture 21 that receives a portion of the elongated member 14, as discussed in greater detail herein. In other embodiments, the tab 20 includes an annular portion 29 that may be coupled to the tab via the aperture 21 or may be fixed coupled via a fastener such as epoxy, adhesive, weld, screw, bolt and nut, rivet, and/or the like.

Figure 3C:
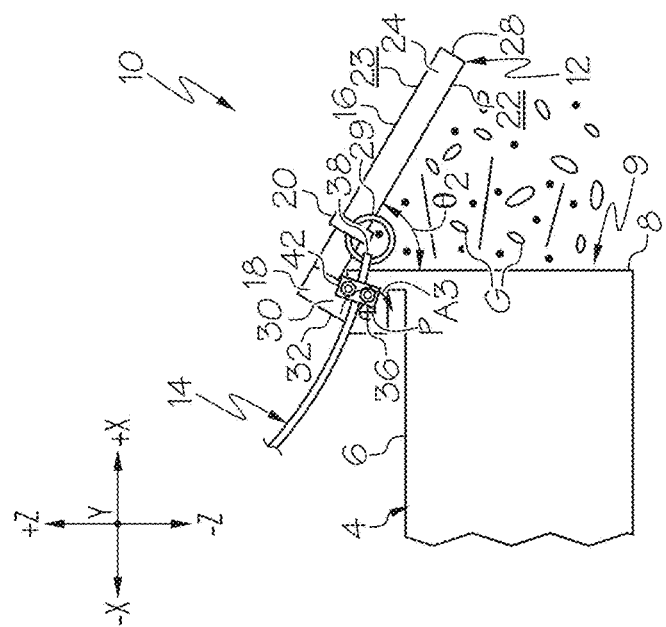
FIG. 3C schematically depicts a partially isolated side view of the variable chute device of FIG. 3A with the deflection plate in one of a plurality of variable controlled partially-open positions, according to one or more embodiments shown and described herein.
Figure 3B:
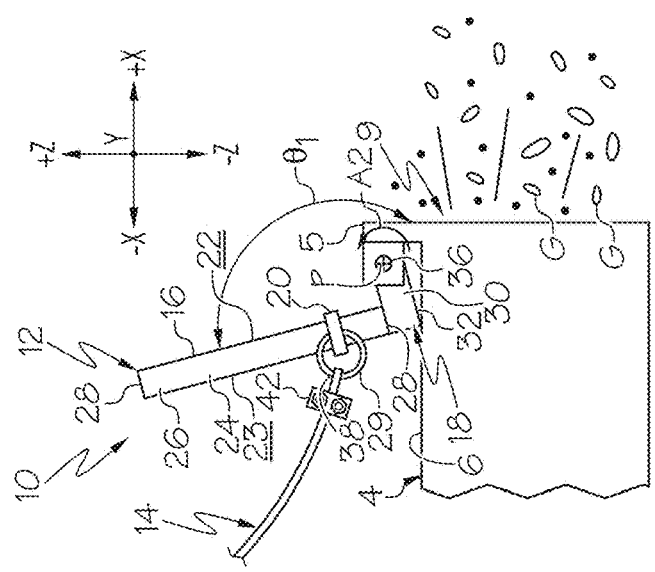
FIG. 3B schematically depicts a partially isolated side view of the variable chute device of FIG. 3A with the deflection plate in an open position, according to one or more embodiments shown and described herein.
Figure 3A:
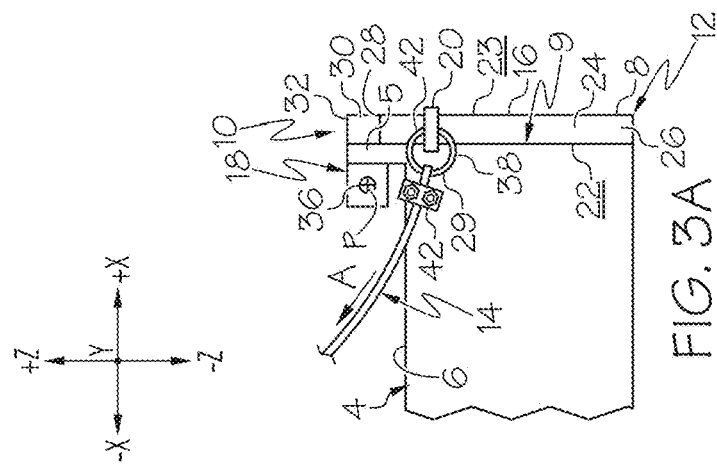
FIG. 3A schematically depicts a partially isolated side view of the variable chute device of FIG. 1 with the deflection plate in the closed position, according to one or more embodiments shown and described herein.

Now referring to FIGS. 1, 2A-2B, and 3A-3C, the elongated member 14 may include a first end 38 and an opposite second end 40. The first end 38 of the elongated member 14 may be coupled to the tab 20 of the deflection plate 12 so that the elongated member 14 is configured to move the deflection plate 12 between a closed position, as best illustrated in FIG. 3A, an open position, as best illustrated in FIG. 3B, and an infinitely number of positions therebetween to variable control the amount of opening of the chute to control the flow of grass clippings (hereinafter referred to as a plurality of variable controlled partially-open positions) therebetween, as best illustrated in FIG. 3C by actuation of the elongated member 14. It should be understood that the plurality of variable controlled partially-open positions may be any of an infinite number of positions between closed and open.

In some embodiments, the first end 38 and/or the second end 40 of the elongated member 14 may be looped and may include a shackle 42 coupling the first end 38 of the elongated member 14 to the tab 20. The loop at the first end 38 of the elongated member 14 may be coupled to the shackle 42, and the shackle 42 may be configured to removably couple the elongated member 14 to the tab 20 of the deflection plate 12. In other embodiments, the first end 38 may be coupled to the tab 20 via other known methods.

The second end 40 of the elongated member 14 may be positioned or coupled to a portion of the power mower 1 in the passenger area 2 to allow the passenger to physically manipulate the elongated member 14 to move the main body 16 of the deflection plate 12 between the closed position, the open position, and the plurality of variably controlled partially-open positions therebetween. In some embodiments, the second end 40 of the elongated member 14 may be coupled to a control arm configured to move and steer the power mower 1. In other embodiments, the second end 40 of the elongated member 14 may be coupled to other components of the power mower 1.

The elongated member 14 may be a flexible member, such as a cable, that is configured to be bendable along a length of the elongated member 14. For example, the cable may be a braided metal cable. However, it is contemplated and possible that the elongated member 14 is a rigid body, such as a rod. In embodiments, with a rod, the rod may be formed with metal such as steel, or alloys, polymers, and/or the like, or any combination thereof. In embodiments, the variable chute device 10 may include mechanisms for maintaining the deflection plate in the closed position and/or the plurality of variably controlled partially-open positions. For example, the variable chute device 10 may include a locking mechanism coupled to the deflection plate 12 that engages a portion of the power mower 1 to prevent the deflection plate 12 from rotating. In a further example, the power mower 1 may include one or more receiving members attached to the power mower 1 at the passenger area 2 that receive the second end 40 of the elongated member 14 to maintain the deflection plate 12 in one of the plurality of variably controlled partially-open positions. In yet another example, the elongated member 14 may be an actuator that automatically moves the deflection plate 12 between the closed position, the plurality of variably controlled partially-open positions, and the open position, and/or maintains the deflection plate 12 in one of the closed position, the open position and the plurality of variably controlled partially-open positions.

Referring still to FIGS. 3A-3C, the main body 16 of the deflection plate 12 may be configured to move about axis P to be movable between the closed position, the plurality of variably controlled partially-open positions, and the open position. As illustrated best in FIG. 3A, in the closed position, the main body 16 may extend across the opening 9 of the chute 4 to prevent grass clippings G (FIGS. 3B-3C) from exiting the chute 4 through the opening 9. In the closed position, the opening 9 may be entirely positioned between the first pair of edges 26 and the second pair of edges 28 of the periphery 24. However, it is contemplated and possible that in the closed position, the main body 16 only partially extends across the opening 9 of the chute 4. In the closed position, the deflection plate 12 may hang from the attachment flanges 5 of the deck 3 to extend to the opening 9 with the deflection surface 22 of the main body 16 facing the opening 9 of the chute 4 so that grass clippings G extending out of the opening 9 contact the deflection surface 22. The weight of the deflection plate 12 may prevent the deflection plate 12 from moving toward one of the plurality of open positions when the grass clippings G (FIGS. 3B-3C) contact the deflection surface 22 of the main body 16.

Referring to FIGS. 3B and 3C, the deflection plate 12 is movable between the plurality of variably controlled partially-open positions to selectively restrict an amount of grass clippings G extending out of the opening 9 of the chute 4. In the plurality of variably controlled partially-open positions, the main body 16 of the deflection plate 12 is pivoted away from the opening 9 of the chute 4 to be spaced apart from the opening 9 of the chute 4 at varying gaps to control a distance traveled by the grass clippings G that exit the chute 4 through the opening 9. The plurality of variably controlled partially-open positions may include one or more partially open positions (FIG. 3C) and a fully open position (FIG. 3B).

Referring to FIG. 3B, in the open position, the main body 16 is pivoted away from the opening 9 about pivot axis P in the direction of arrow A2 to not restrict grass clippings G from exiting the opening 9 to allow the grass clippings G to extend the predetermined distance from the power mower 1. In other words, the main body 16 may be pivoted away from the opening 9 so that an orthographic projection of the opening 9 extending away from the deck 3 and the passenger area 2 does not intersect the main body 16. Further, the open position may be maintained without any additional tension from the elongated member and the flange member 32 of the attachment portion 18 may rest on an exterior surface 36 of the deck 32 to move the main body 16 in a position beyond 180 degrees with respect to the opening 9 as illustrated by θ1.

Referring to FIG. 3C, in one of the plurality of variably controlled partially-open positions, the main body 16 may be closer to the opening 9 than the main body 16 in the fully open position. That is the theta distance θ2 of the main body 16 with respect to the opening 9 is less than the theta distance θ1 illustrated for the opening position. As such, the plurality of variably controlled partially-open positions may be any of an infinite number of positions where the theta distance is greater than zero (e.g., not equal to zero, as illustrated in FIG. 3A) and where less than theta distance θ1 illustrated in FIG. 3B.

When moving from the open position to one of the plurality of variably controlled partially-open positions, the main body 16 is pivoted toward the opening 9 about pivot axis P in the direction of arrow A3. In the plurality of variably controlled partially-open positions, the main body 16 may be spaced apart from the opening 9 to partially restrict grass clippings G from exiting the opening 9. As such, the plurality of variably controlled partially-open positions reduces the amount of clippings G allowed or permitted to exit the opening 9 distance that the grass clippings G that are expelled through the opening 9 beyond the edge 28 of the deflection plate 12 travel less of a distance than those when the deflection plate 12 is in the open position, as illustrated best in FIG. 3B. That is, in one of the variably controlled partially-open positions, the deflection surface 22 is spaced apart from the opening such that the main body 16 is positioned at least partially orthogonal to the opening 9 such that one edge of the second pair of edges 28 is extending away from the deck 3 and the passenger area 2.

The operation of the power mower 1 and the variable chute device 10 will now be described with reference to FIGS. 1, 2A-2B, and 3A-3C. When operating the power mower 1, the grass cut by the blades housed within the deck 3 produces grass clippings G that are directed away from the deck 3 through the chute 4 and are expelled through the opening 9. The grass clippings G may extend, or travel, a predetermined distance away from the power mower 1. In conventional assemblies, the grass clippings G may move away from the power mower 1 toward an area that the user does not want grass clippings G to contact or accumulate at. The area may be a structure such as a road, a driveway, a house, a garden, or the like.

The variable chute device 10 may control the amount of grass clippings G expelled out of the chute 4, and limit a distance that the grass clippings G travel from the chute 4. That is, the main body 16 of the deflection plate 12 may moved between the closed position, the open position and the plurality of variably controlled partially-open positions. In the closed position, the main body 16 may extend across the opening 9 of the chute 4 such that the deflection surface 22 faces the opening to prevent grass clippings G from exiting the chute 4 through the opening 9. When the user desires to allow clippings G to be expelled from the opening 9, the elongated member 14 is moved, which in turn moves or pivots the deflection plate 12 via the tab 20 about pivot axis P at the pins 36 in the direction illustrated by arrow A2, as best illustrated in FIG. 3B.

In the plurality of variably controlled partially-open positions, the deflection surface 22 of the deflection plate 12 is moved away from the opening 9 via the elongated member 14 to selectively restrict an amount of grass clippings G extending out of the opening 9 of the chute 4 when compared to the open position. As such, in the plurality of variably controlled partially-open positions, the deflection surface 22 of the deflection plate 12 is incrementally spaced apart from the opening 9 such that the greater the space, the less restrictive the deflection plate blocks clipping G from being expelled from the opening 9 of the chute 4. That is, in the plurality of variably controlled partially-open positions and in the open position, the main body 16 of the deflection plate 12 is pivoted away from the opening 9 of the chute 4 to be spaced apart from the opening 9 of the chute 4 at varying gaps to control a distance traveled by the grass clippings G that exit the chute 4 through the opening 9. As such it should be understood that the movement into the open position may occur from the closed position or from any of the plurality of variably controlled partially-open positions and movement into the any of the plurality of variably controlled partially-open positions may occur from the closed position, the open position, or any other of the any of the plurality of variably controlled partially-open positions.

When the user desires to prohibit altogether or restrict clippings G from expelling from the opening 9, the elongated member 14 is moved in an opposite direction than that for movement of A2, which in turn moves or pivots the deflection plate 12 via the tab 20 about pivot axis P at the pins 36 in the direction illustrated by arrow A3, as best illustrated in FIG. 3C. As such, this movement may move the deflection surface 22 of the main body 16 of the deflection plate 12 is pivoted towards the opening 9 of the chute 4 to be spaced apart from the opening 9 of the chute 4 at varying gaps to control a distance traveled by the grass clippings G that exit the chute 4 through the opening 9 or may be moved such that the deflection surface 22 abuts the opening 9 to prohibit any clippings G from being expelled from the opening 9 of the chute 4. As such it should be understood that the movement into the closed position may occur from the open position or from any of the plurality of variably controlled partially-open positions.

Referring still to FIGS. 1, 2A-2B, and 2A-3C, and now referring to FIG. 4, an example flowchart of an illustrative method 400 of operating the variable chute device 10 is schematically depicted. The method 400 will be described with additional reference to FIGS. 1-2 and 3A-3C. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

With the deflection plate 12 initially in the closed position, the user may manipulate the second end 40 of the elongated member 14 to move the deflection plate 12 from the closed position to the open position to allow the grass clippings G to extend out of the opening 9 of the chute 4 uninhibited. The user may move or pull the elongated member 14 to pivot the main body 16 of the deflection plate 12 about pivot P (about the pair of pins 36 extending through the attachment flanges 5 of the deck 3 and the attachment portion 18 of the deflection plate 12) to pivot the deflection plate 12 away from the opening 9 in the direction illustrated by arrow A2 in FIG. 3B. It should also be appreciated that the user may move or pull the elongated member 14 to pivot the main body 16 of the deflection plate 12 about pivot P to move the deflection plate 12 into any of the plurality of variably controlled partially-open positions.

When in the open position (or one of the plurality of variably controlled partially-open positions), the grass clippings G extend the predetermined distance away from the power mower 1 and chute 4. At block 402, when the power mower 1 is a distance away from an undesirable area such as an area with a structure that is less than the predetermined distance that the grass clippings G are expelled, the user may determine a distance of which the grass clippings G travel that is less than the predetermined distance so that the grass clippings G do not expel into the undesirable area.

At block 404, the user may actuate the elongated member 14 to move the main body 16 of the deflection plate 12 from the open position to either of one of the variably controlled partially-open positions or the closed position by manipulating the second end 40 of the elongated member 14 to reduce or restrict the distance that the grass clippings G expel or extend out of the opening 9 of the chute 4. In some embodiments, the user may hold the second end 40 of the elongated member 14 to maintain the deflection plate 12 in the one of the plurality of variably controlled partially-open positions. In other embodiments, the second end 40 of the elongated member 14 may be locked under tension, such as with a cable clamp, a carabineer, and/or the like, to maintain the deflection plate 12 in the one of the plurality of variably controlled partially-open positions.

At block 406, the user determine whether the distance of which the grass clippings G are expelled through the opening 9 exceed the predetermined distance between the power mower 1 and the undesirable area. When the distance between the undesirable area and the power mower 1 is less than the distance that the grass clippings G are traveling, the user may further manipulate the elongated member 14 to adjust the deflection plate 12 between the plurality of variably controlled partially-open positions to further reduce or restrict the distance that the grass clippings G travel. When the distance that the grass clippings G are traveling is less than the distance between the power mower 1 and the undesirable area, the user maintain the elongated member 14 in the current position to maintain the deflection plate 12 in position. In the case that the power mower 1 is moving directly adjacent to the undesirable area, the user may manipulate the elongated member 14 to move the deflection plate 12 to the closed position, thereby preventing grass clippings G from exiting through the opening 9 of the chute 4.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A variable chute device for a power mower, the power mower including a passenger area, a deck, and a chute extending from the deck, the chute including an opening through which the chute expels grass clippings away from the power mower, the variable chute device comprising:
   an elongated member;
   a deflection plate, the elongated member extending between the deflection plate and the passenger area, the deflection plate comprising:
      a main body comprising a deflection surface; and
      an attachment portion to movably couple the main body to the deck of the power mower;
      the main body is movable between a closed position, an open position, and a plurality of infinitely variably controlled partially-open positions by actuation of the elongated member, wherein, in the closed position, the main body extends across the opening of the chute to prevent grass clippings from exiting the chute through the opening, in the plurality of variably controlled partially-open positions, the main body is spaced apart from the opening of the chute at varying gaps to control an amount of the grass clippings to exit the chute through the opening, and in the open position, a bottommost edge of the main body is positioned above the deck in a vertical direction.

2. The variable chute device of claim 1, wherein the elongated member is a flexible member comprising a first end coupled to the deflection plate and a second end opposite the first end extending to the passenger area.

3. The variable chute device of claim 1, wherein the elongated member is a rigid body.

4. The variable chute device of claim 1, wherein the attachment portion comprises a pair of coupling flanges extending transversely to the main body and coupled to the deck of the power mower to pivotally couple the main body to the deck of the power mower.

5. The variable chute device of claim 4, wherein the pair of coupling flanges each comprise an extension portion that extends in parallel with the main body and a coupling portion that extends transversely to the extension portion.

6. The variable chute device of claim 5, further comprising a pair of pins extending through the coupling portions of the pair of coupling flanges to pivotally couple the deflection plate to the deck of the power mower.

7. The variable chute device of claim 4, wherein the attachment portion further comprises a flange member that extends between the pair of coupling flanges.

8. The variable chute device of claim 7, wherein the flange member extends transversely to the main body and the pair of coupling flanges.

9. The variable chute device of claim 1, wherein:
the deflection plate further comprises a tab extending from a periphery of the main body, and
the elongated member is coupled to an aperture of the tab.

10. The variable chute device of claim 9, wherein:
the periphery of the main body includes a first pair of edges, the bottommost edge, and a second edge spaced apart from the bottommost edge, the first pair of edges extending between the second edge and the bottommost edge,
the tab extends from one of the first pair of edges of the periphery, and
the attachment portion extends from the second edge of the periphery.

11. The variable chute device of claim 1, wherein at least one of the first end or the second end of the elongated member includes a loop defined by the elongated member.

12. A power mower having a variable chute device, a deck positioned above one or more power mower blades in a power mower vertical direction, a chute extending from the deck, the chute having an opening, the chute is configured to expel grass clippings through the opening away from the power mower, and a passenger area, the variable chute device comprising:
an elongated member comprising a first end and a second end opposite, the second end extending to the passenger area;
a deflection plate, the first end of the elongated member coupled to the deflection plate, the deflection plate having:
a main body comprising a deflection surface and a periphery defined by a plurality of edges extending around the deflection surface; and
an attachment portion extending from the periphery of the main body to movably couple the main body to the deck of the power mower, the attachment portion having:
a pair of coupling flanges extending transversely to the main body and coupled to the deck of the power mower to pivotally couple the main body to the deck of the power mower,
wherein the main body is movable between a closed position, an open position, and a plurality of infinitely variably controlled partially-open positions therebetween by actuation of the elongated member, wherein in the closed position, the main body extends across the opening of the chute to prevent grass clippings from exiting the chute through the opening, in the plurality of variably controlled partially-open positions, the main body is spaced apart from the opening of the chute at varying gaps to control an amount of the grass clippings to exit the chute through the opening, and in the open position a bottommost edge of the plurality of edges is positioned above the deck in a vertical direction.

13. The variable chute device of claim 12, wherein the elongated member is a flexible member.

14. The variable chute device of claim 12, wherein the elongated member is a rigid body.

15. The variable chute device of claim 12, wherein the pair of coupling flanges each have an extension portion that extends in parallel with the main body and a coupling portion that extends transversely to the extension portion.

16. The variable chute device of claim 15, further comprising a pair of pins extending through the coupling portions of the pair of coupling flanges to pivotally couple the deflection plate to the deck of the power mower.

17. The variable chute device of claim 15, wherein the attachment portion further comprises a flange member that extends between the pair of coupling flanges.

18. The variable chute device of claim 17, wherein the flange member extends transversely to the main body and the pair of coupling flanges.

19. The variable chute device of claim 12, wherein:
the deflection plate further comprises a tab extending from the periphery of the main body, and
the elongated member is coupled to an aperture of the tab.

20. The variable chute device of claim 19, wherein:
the plurality of edges that define the periphery of the main body includes a first pair of edges the bottommost edge, and a second edge spaced apart from the bottommost edge, the first pair of edges extending between the second edge and the bottommost edge,
the tab extends from one of the first pair of edges of the periphery, and
the attachment portion extends from the second edge of the periphery.

* * * * *